Nov. 25, 1930.    C. D. SUTTON    1,782,519
ELECTRIC METER
Filed May 3, 1929

Inventor
Charles D. Sutton
by David Rines
Attorney

Patented Nov. 25, 1930

1,782,519

UNITED STATES PATENT OFFICE

CHARLES DAVID SUTTON, OF WATERBEACH, ENGLAND, ASSIGNOR TO CAMBRIDGE INSTRUMENT COMPANY, LIMITED, OF LONDON, ENGLAND, A CORPORATION OF GREAT BRITAIN

ELECTRIC METER

Application filed May 3, 1929, Serial No. 360,198, and in Great Britain January 26, 1929.

This invention, though having other and broader fields of application, relates more particularly to electric meters and other measuring instruments, such as moving-coil galvanometers.

Electric galvanometers and similar instruments are frequently subjected to bad treatment, such as shocks and vibration and, when used on board ship, to considerable changes of level. These circumstances are very severe on the delicate pivots which are used in the most sensitive types of instrument, resulting in deformation of the pivots, with a consequent increase in friction, leading to inaccuracies in the indications of the instruments. In the manufacture of such galvanometers, it has been proposed to mount the jewels in which the pivots are supported on springs, to lessen the shocks to which the pivots may be subjected. Among the great difficulties attendant upon the use of mechanically sprung pivots, however, is that there is little space available for the accommodation of springs of adequate resilience.

An object of the present invention, therefore, is to provide a new and improved instrument that shall be shock and vibration proof.

To the attainment of the above end, a feature of the invention resides in floatingly supporting the bearings of the moving system of the instrument, with their supports, magnetically in the field of the instrument magnet. A very delicate and resilient support is thus obtained that very effectively counters shocks without injuring the instrument.

Other and further objects will be explained hereinafter, it being understood that the invention consists of the improved measuring instrument a preferred embodiment of which is hereinafter described, illustrated in the accompanying drawings and defined in the appended claims.

Figure 1:
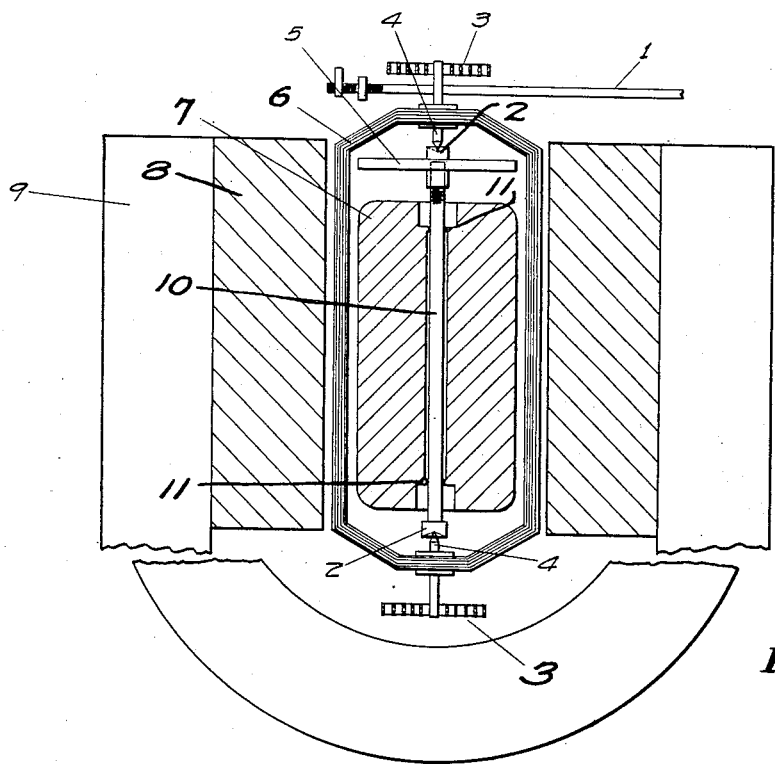
Figure 2:
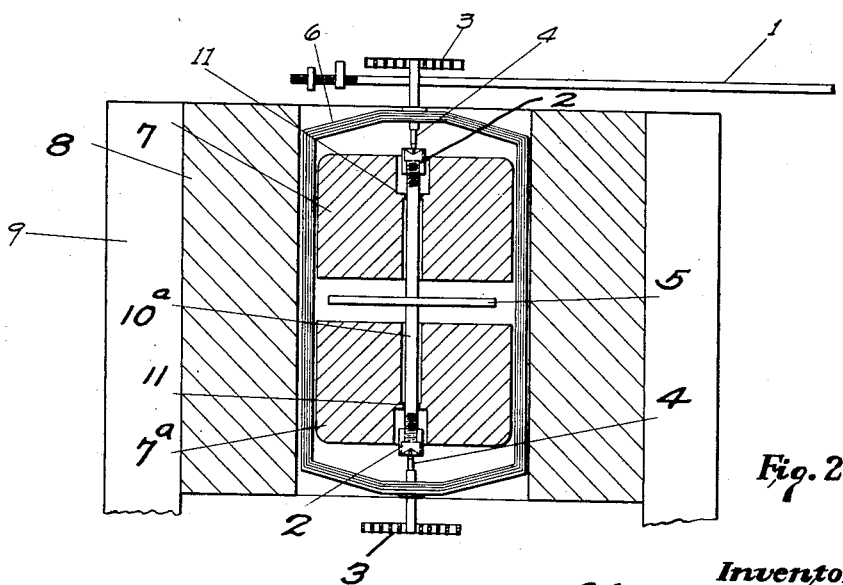

One method of carrying the invention into effect by way of example will now be described with reference to the accompanying drawings, in which Fig. 1 represents diagrammatically a section through the magnets and moving parts of a galvanometer; and Fig. 2 is a similar view of a modification.

Meters of the type under consideration commonly comprise a pointer or other indicator 1, adapted to be actuated by the magnetic flux consequent upon an electric current flowing through a moving coil or winding 6, surrounding an iron or steel core 7, which is mounted between pole pieces 8 fixed to a magnet,—usually a permanent magnet, though it may be an electromagnet. The core 7 is, as usual, rigidly attached to the fixed part of the instrument, and located in the center of the gap between the pole pieces 8. A very light rod or tube 10, preferably made of aluminum, is free to slide vertically in the bearings 11 that are formed in a vertically disposed central bore of the core 7. The rod 10 is thus held in position in the center of the magnetic field by the bearings 11. Two jewels or pivot bearings 2 are mounted at the upper and lower ends of the rod 10. Seated in the pivot bearings 2 are pivots 4 that carry the moving coil 6.

According to the preferred embodiment of the invention illustrated in Fig. 1, a soft iron member 5 is fixed to the top of the rod 10. The member 5 may be a complete circular disc, as shown, or it may be made up of two sectors, one opposite each pole piece. The disc 5 may be reduced for lightening purposes by cutting off symmetrical sectors or pieces which are lens shaped in plan, leaving a piece shaped like the moving vane of a quadrant electrometer.

In operation, the permanent magnet 9 induces magnetism both in the core 7 and in the soft iron disc 5. The core 7 and the disc 5, therefore, both become magnetized with like poles opposite to each other, so that they tend to repel each other. This repulsion is amply sufficient to support the disc 5 in stable equilibrium at a certain distance above the core 7. The disc 5 cannot rise indefinitely, as it is magnetically held down in the field of the magnet, and the repulsion of the core decreases as the distance increases. In action, of course, the iron disc 5 and the centre rod 10 and the jewels 2 do not rotate, but the coil 6, together with the pointer 1, rotates freely on the pivots 4 when the current in the coil changes its value. The movements of the coil are controlled, in the usual way, by means of hair springs 3, which also may be used in the usual way for leading the current in and out of the coil. These hair springs, owing to their shape and size, have practically no effect in supporting the weight of the coil. The whole weight of the coil, together with the rod 10 and the disc 5, is entirely floated by the repulsion of the magnetism in the core 7. In effect, the apparent result, in an actual instrument, is as though the disc 5 were supported on the core 7 by delicate air cushion, and the practical result is a considerable improvement on anything that can be done by means of ordinary springs.

It will now be perceived that the present invention is most effective when the axis of the coil of the galvanometer is vertical, as shown in the drawings, as there is then no force, and consequently no friction, in the bearings 11 resisting the movement of the central rod 10 under the effects of jars or vibrations. The device, however, will function reasonably well when the galvanometer is tilted to considerable angles.

In the modification shown in Fig. 2, the soft iron core is divided into two pieces 7 and 7ª and the disc 5 mounted near the middle of the rod 10 and practically midway in the gap between the pieces 7 and 7ª. The disc 5 is thus repelled from both parts 7 and 7ª of the core, owing to the induced magnetism in the soft iron disc 5 and in the core parts. Apart from gravity forces, the disc would settle in equilibrium in the middle of the gap. Gravity, however, when the pivots are vertical, will cause the disc to remain in equilibrium in a slightly lower position. The arrangement of jewels, pivots and the like remains as in Fig. 1.

Other modifications, too, will readily occur to persons skilled in the art, and all such are considered to fall within the spirit and scope of the present invention, as defined in the appended claims.

What is claimed is:

1. A meter comprising an indicator having a pivot, a magnet having pole pieces, a bearing for the pivot, a movable magnetizable support for the bearing disposed between the pole pieces, a magnetizable core fixed between the pole pieces adjacent to the support, whereby the support and the core become magnetized in the same sense to cause the support to become repelled from the core, and a winding disposed between the pole pieces adapted for the passage of an electric current to cause the pivoting of the indicator about its pivot on the bearing.

2. A meter comprising a magnet having pole pieces, a magnetizable core fixed between the pole pieces and having a bearing, a rod slidable in the bearing and provided with two pivot bearings, an indicator having a pivot resting against each pivot bearing, a magnetizable member secured to the rod to one side of the core, whereby the core and the member become magnetized in the same sense to cause the rod with the pivot bearings to become floatingly supported in opposition to the force of gravity, and a winding disposed between the pole pieces, carried by the pivots, and adapted for the passage of an electric current to effect a pivoting movement of the indicator about its pivots on the pivot bearing.

3. An instrument of the class described comprising an indicator having a pivot, a bearing for the pivot, means for producing a magnetic field, a winding supported by the bearing and disposed in the magnetic field and adapted for the passage of an electric current to cause the pivoting of the indicator about the pivot on the bearing, and means controlled by the magnetic field for controlling the position of the bearing.

In testimony whereof I have hereunto set my hand.

CHARLES DAVID SUTTON.